US 9,985,407 B2

(12) United States Patent
Matsuoka (10) Patent No.: US 9,985,407 B2
(45) Date of Patent: May 29, 2018

(54) FIBER LASER APPARATUS AND METHOD OF DETECTING FAILURE OF FIBER LASER APPARATUS

(71) Applicant: FUJIKURA LTD., Tokyo (JP)

(72) Inventor: Yuji Matsuoka, Sakura (JP)

(73) Assignee: FUJIKURA LTD., Tokyo (JP)

( * ) Notice: Subject to any disclaimer, the term of this patent is extended or adjusted under 35 U.S.C. 154(b) by 114 days.

(21) Appl. No.: 15/240,442

(22) Filed: Aug. 18, 2016

(65) Prior Publication Data

US 2016/0359288 A1 Dec. 8, 2016

Related U.S. Application Data

(63) Continuation of application No. PCT/JP2014/078069, filed on Oct. 22, 2014.

(30) Foreign Application Priority Data

Feb. 25, 2014 (JP) .................................. 2014-033635

(51) Int. Cl.
*H01S 3/00* (2006.01)
*H01S 3/23* (2006.01)
(Continued)

(52) U.S. Cl.
CPC .......... *H01S 3/0014* (2013.01); *G01J 1/4257* (2013.01); *G01J 1/44* (2013.01); *G02B 6/2804* (2013.01);
(Continued)

(58) Field of Classification Search
CPC ...... H01S 3/0014; H01S 3/2383; H01S 3/067; G01J 1/4257; G01J 1/44; G02B 6/4286; G02B 6/2804
(Continued)

(56) References Cited

U.S. PATENT DOCUMENTS 4,964,131 A * 10/1990 Liu ...................... G01C 19/721
372/6
8,811,434 B2 * 8/2014 Miyato ................. H01S 3/0014
372/38.09

(Continued)

FOREIGN PATENT DOCUMENTS

JP 51-120696 10/1976
JP 2004-207420 A 7/2004
(Continued)

OTHER PUBLICATIONS

Internaltion Search Report dated Jan. 20, 2015, issued in counterpart application No. PCT/JP2014/078069 (2 pages).
(Continued)

*Primary Examiner* — Seung C Sohn
(74) *Attorney, Agent, or Firm* — Westerman, Hattori, Daniels & Adrian, LLP (57) ABSTRACT

To provide a fiber laser apparatus capable of detecting a failure of an optical fiber within a wide range of the apparatus with an inexpensive configuration. The fiber laser apparatus 100 has a plurality of fiber laser units 110, a combiner 120 operable to optically combine output laser beams outputted from the fiber laser unit 110 to generate a combined laser beam, a laser emission portion 130 operable to emit the combined laser beam, output laser beam power detection parts 170 operable to detect a power of an output laser beam of each of the fiber laser units 110, a combined laser beam power detection part 140 operable to detect a power of the combined laser beam, and a failure detection part 160 operable to compare the total of detected powers of the output laser beams (total laser beam power) with the detected power of the combined laser beam and determine that a failure has occurred in the fiber laser unit 110 when a ratio of the power of the combined laser beam to the total
(Continued)

laser beam power becomes lower than a predetermined threshold T.

14 Claims, 5 Drawing Sheets

(51) Int. Cl.
  *G01J 1/42* (2006.01)
  *G01J 1/44* (2006.01)
  *G02B 6/28* (2006.01)
  *G02B 6/42* (2006.01)
  *H01S 3/067* (2006.01)

(52) U.S. Cl.
  CPC ............ *G02B 6/4286* (2013.01); *H01S 3/067* (2013.01); *H01S 3/2383* (2013.01); *H01S 3/0675* (2013.01)

(58) Field of Classification Search
  USPC ........................................ 250/553; 372/38.09
  See application file for complete search history.

(56) References Cited

U.S. PATENT DOCUMENTS

| 2008/0273123 A1 | 11/2008 | Morikawa et al. |
| 2013/0299474 A1 | 11/2013 | Kashiwagi et al. |

FOREIGN PATENT DOCUMENTS

| JP | 2005-317841 A | 11/2005 |
| JP | 2006-292674 A | 10/2006 |
| JP | 2010-238709 A | 10/2010 |
| JP | 2013-197332 A | 9/2013 |
| WO | 2007/032422 A1 | 3/2007 |
| WO | 2012/036664 A1 | 3/2012 |
| WO | 2012/099116 A1 | 7/2012 |

OTHER PUBLICATIONS

Extended (supplementary) European Search Report dated Nov. 21, 2017, issued in counterpart European Application No. 14884180.2. (6 pages).

* cited by examiner

FIBER LASER APPARATUS AND METHOD OF DETECTING FAILURE OF FIBER LASER APPARATUS

TECHNICAL FIELD

The present invention relates to a fiber laser apparatus and a method of detecting a failure of a fiber laser apparatus, and more particularly to a fiber laser apparatus operable to optically combine laser beams from a plurality of fiber laser units and output the combined beam and a method of detecting a failure of a fiber laser apparatus.

BACKGROUND ART

In recent years, the output power of fiber lasers has been increased. There has been developed a fiber laser apparatus having a plurality of fiber laser units that combines laser outputs from the respective fiber laser units to obtain a high power of several kilowatts. Since such a fiber laser apparatus has a high power, the quantity of light of excess losses, such as losses at a fusion splicing portion or losses caused by generation of higher modes due to a bent of a fiber, may be increased. Such excess losses may increase heat being generated. Heat generation due to excess losses may directly result in a failure such as a breakage of the fiber. Therefore, most of such high-power fiber laser apparatuses are provided with means for detecting a failure of the apparatus, such as a breakage of a fiber.

For example, Patent Literature 1 discloses a method of detecting a failure of a fiber laser apparatus. The method includes detecting, with imaging means (photodetector), a laser beam leaking out of a fusion splicing portion in the fiber laser apparatus when a failure occurs, and thus detecting a breakage of an optical component in the fiber laser apparatus. With this method, however, imaging means (photodetector) needs to be provided for each of portions where any failure is likely to occur. Therefore, if a breakage of an optical fiber occurs at any portion other than the predicted breakable portions, then such a failure cannot be detected. When portions where any failure is likely to occur exist over a wide range of the apparatus, a large number of imaging means are required. Thus, the cost of the apparatus is increased.

PRIOR ART LITERATURE

Patent Literature

Patent Literature 1: JP 2010-238709 A

SUMMARY OF THE INVENTION

Problem(s) to be Solved by the Invention

The present invention has been made in view of the above drawbacks of the prior art. It is, therefore, a first object of the present invention to provide a fiber laser apparatus capable of detecting a failure of an optical fiber within a wide range of the apparatus with an inexpensive configuration.

A second object of the present invention is to provide a method of detecting a failure of a fiber laser apparatus that can detect, with an inexpensive configuration, a failure of an optical fiber within a wide range of a fiber laser apparatus having a plurality of fiber laser units.

Means for Solving Problem(s)

According to a first aspect of the present invention, there can be provided a fiber laser apparatus capable of detecting a failure of an optical fiber within a wide range of the apparatus with an inexpensive configuration. The fiber laser apparatus has a plurality of fiber laser units each having an amplifying optical fiber operable to amplify a laser beam, a pumping light source operable to supply pumping light to the amplifying optical fiber, and an optical cavity operable to oscillate the laser beam a combiner operable to optically combine output laser beams outputted from the plurality of fiber laser units to generate a combined laser beam, a laser emission portion operable to emit the combined laser beam generated by the combiner, a plurality of output laser beam power detection parts operable to detect a power of an output laser beam outputted from the optical cavity of each of the plurality of fiber laser units, and a combined laser beam power detection part operable to detect a power of the combined laser beam generated by the combiner. The fiber laser apparatus also has a failure detection part including an adder part operable to sum up the powers of the output laser beams detected by the output laser beam power detection parts of the plurality of fiber laser units to calculate a total laser beam power, a comparator part operable to compare the total laser beam power calculated by the adder part with a power of the combined laser beam detected by the combined laser beam power detection part, and a determination part operable to determine that a failure has occurred in at least one of the plurality of fiber laser units when a ratio of the power of the combined laser beam to the total laser beam power becomes lower than a predetermined threshold T.

According to a second aspect of the present invention, there is provided a method of detecting a failure in a fiber laser apparatus operable to emit a combined laser beam into which output laser beams outputted from a plurality of fiber laser units are combined by a combiner. Each of the fiber laser units has an amplifying optical fiber operable to amplify a laser beam, a pumping light source operable to supply pumping light to the amplifying optical fiber, and an optical cavity operable to oscillate the laser beam. This method includes detecting as power of the output laser beam outputted from the optical cavity of each of the plurality of fiber laser units, detecting a power of the combined laser beam on a downstream side of the combiner, summing up the detected powers of the output laser beams from the plurality of fiber laser units to calculate a total laser beam power, comparing the total laser beam power with the detected power of the combined laser beam, and determining that a failure has occurred in at least one of the plurality of fiber laser units when a ratio of the power of the combined laser beam to the total laser beam power becomes lower than a predetermined threshold T.

The predetermined threshold T may be set to be $(U-1)/U$ where U is the number of the plurality of fiber laser units. At that time, the determination part of the failure detection part determines that a failure has occurred in one of the plurality of fiber laser units when a ratio of the power of the combined laser beam to the total laser beam power becomes lower than the predetermined threshold T. Alternatively, the predetermined threshold T may be set to be $(U-n)/U$ where U is the number of the plurality of fiber laser units, and n is an integer that is equal to or greater than 1 but equal to or smaller than U. In this case, the determination part of the failure detection part determines that a failure has occurred in n of the plurality of fiber laser units when a ratio of the power of the combined laser beam to the total laser beam power becomes lower than the predetermined threshold T.

Furthermore, the predetermined threshold T may be set so as to meet the following inequality:

$$(1+\alpha) \cdot T < 1 - \beta$$

$$(1-\alpha) \cdot T \geq (1+\beta)\frac{U-1}{U}$$

where U is the number of the plurality of fiber laser units, ±α is a detection accuracy of the power at the output laser beam power detection part, and ±β is a detection accuracy of the power at the combined laser beam power detection part. At that time, the determination part of the failure detection part determines that a failure has occurred in one of the plurality of fiber laser units when a ratio of the power of the combined laser beam to the total laser beam power becomes lower than the predetermined threshold T.

Moreover, the predetermined threshold T may be set so as to meet the following inequality:

$$(1+\alpha) \cdot T < 1 - \beta$$

$$(1-\alpha) \cdot T \geq (1+\beta)\frac{U-n}{U}$$

where U is the number of the plurality of fiber laser units, n is an integer that is equal to or greater than 1 but equal to or smaller than U, ±α is a detection accuracy of the power at the output laser beam power detection part, and ±β is a detection accuracy of the power at the combined laser beam power detection part. At that time, the determination part of the failure detection part determines that a failure has occurred in n of the plurality of fiber laser units when a ratio of the power of the combined laser beam to the total laser beam power becomes lower than the predetermined threshold T.

Furthermore, the failure detection part may include a drive control part operable to control a current to be supplied to pumping light sources of the plurality of fiber laser units so as to operate at least one of the plurality of fiber laser units in sequence. At that time, the determination part of the failure detection part specifies a fiber laser unit in which the failure has occurred from the at least one of the plurality of fiber laser units that is being driven by the drive control part, based on a difference between the total laser beam power calculated by the adder part and the power of the combined laser beam that is detected by the combined laser beam power detection part.

Moreover, the combined laser beam power detection part may include a photodetector operable to receive leakage light from a fusion splicing portion provided on an optical fiber connecting, between the combiner and the laser emission portion. In this case, when the photodetector is disposed on a downstream side of the fusion splicing portion, it is possible to reduce influence from feedback light generated when the combined laser beam emitted from the fiber laser apparatus is reflected back from a workpiece.

Advantageous Effects of the Invention

According to the present invention, the total of the powers of the output laser beams (total laser beam power), which can be obtained at the output laser beam power detection parts of the respective fiber laser units, is compared with the combined laser beam power, which can be obtained at the combined laser beam power detection part disposed downstream of the combiner that combines the output laser beams of the fiber laser units, to detect whether or not a failure such as fiber breakage has occurred between the output laser beam power detection parts of the respective fiber laser units and the combined laser beam power detection part disposed downstream of the output laser beam power detection parts. In other words, any failure such as fiber breakage can be detected at any point between the output laser beam power detection parts and the combined laser beam power detection part. Therefore, any failure of the optical fibers can be detected within a wide range from the output laser beam power detection parts to the combined laser be power detection part simply by providing two types of detection parts including the output laser beam power detection part in each of the fiber laser units and the combined laser beam power detection part. Thus, a large number of detection parts (photodetectors) are not required to be provided in each of the fiber laser units. Accordingly, the cost of the fiber laser apparatus can be reduced.

MODE(S) FOR CARRYING OUT THE INVENTION

Embodiments of a fiber laser apparatus according to the present invention will be described in detail below with reference to FIGS. 1 to 5. In FIGS. 1 to 5, the same or corresponding components are denoted by the same or corresponding reference numerals and will not be described below repetitively.

Figure 1:
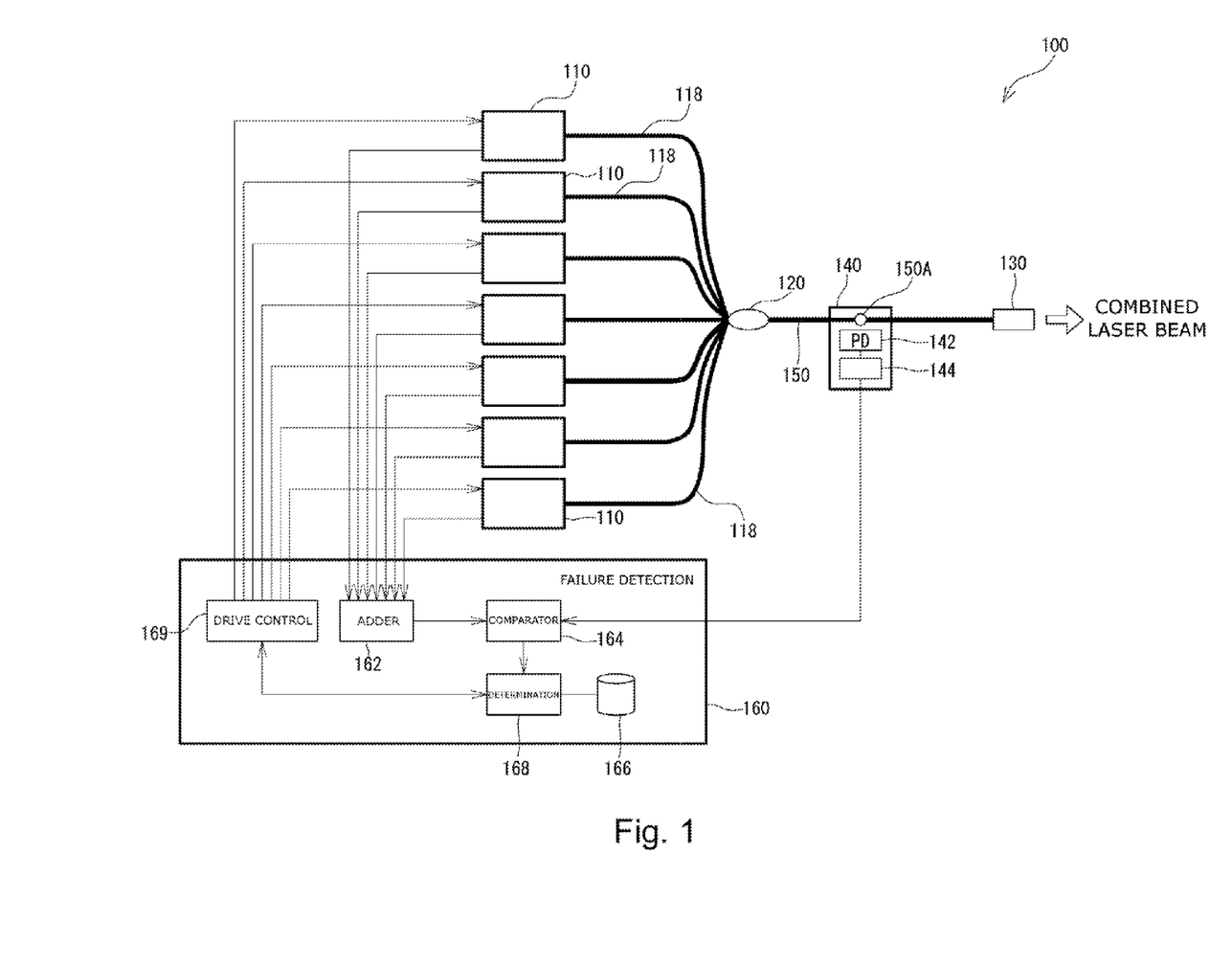
FIG. 1 is a diagram schematically showing a configuration of a fiber laser apparatus according to an embodiment of the present invention.

FIG. 1 is a diagram schematically showing a configuration of a fiber laser apparatus 100 according to an embodiment of the present invention. As shown in FIG. 1, the fiber laser apparatus 100 has a plurality of fiber laser units 110 operable to output a laser beam (seven fiber laser units 110 in the example of FIG. 1), a combiner 120 operable to combine laser beams (output laser beams) outputted from the respective fiber laser units 110, and a laser emission portion 130 operable to emit the laser beam combined by the combiner 120, for example, toward a workpiece to be processed.

Figure 2:
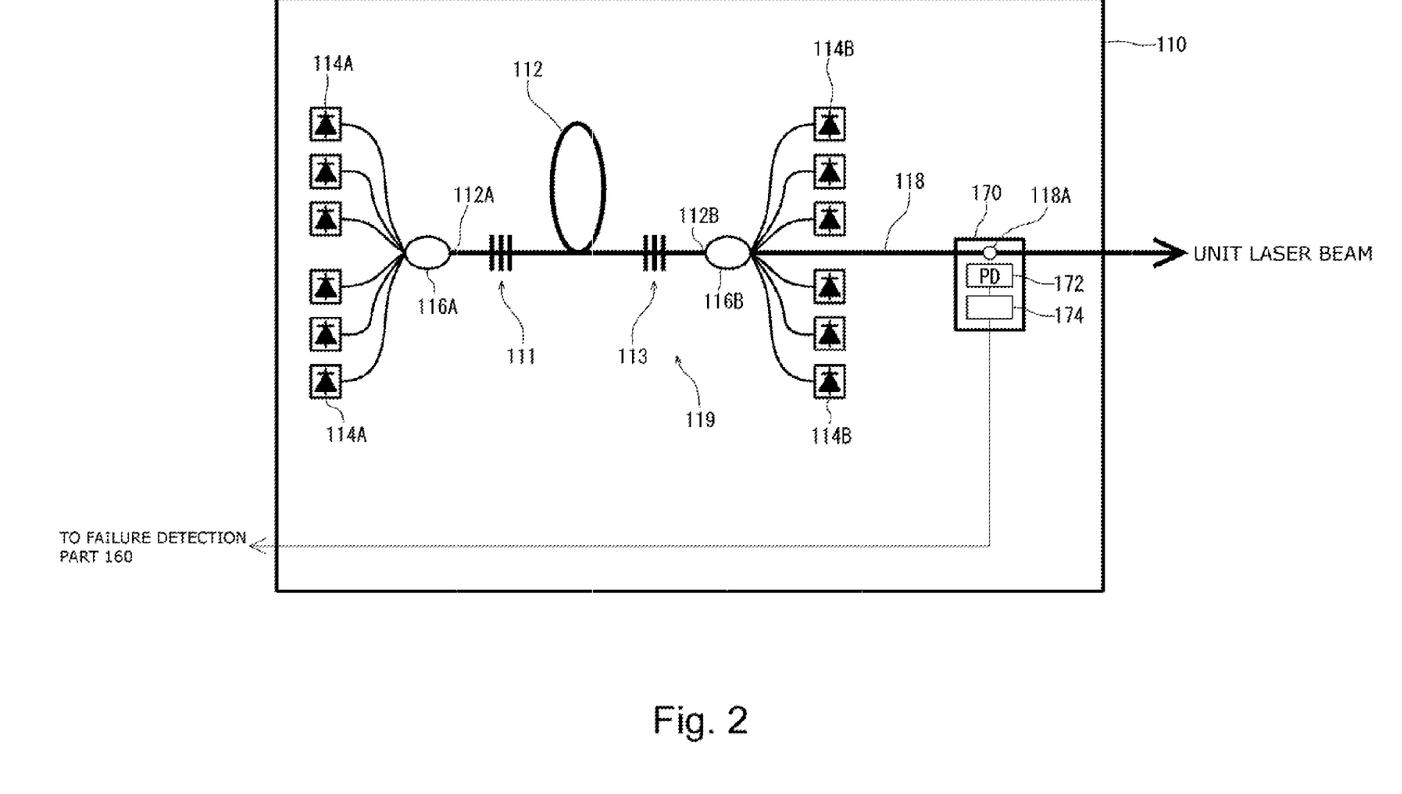
FIG. 2 is a diagram schematically showing one of the fiber laser units of the fiber laser apparatus shown in FIG. 1.

FIG. 2 is a diagram schematically showing one of the fiber laser units 110. As shown in FIG. 2, the fiber laser unit 110 includes an amplifying optical fiber 112 that has been doped with a rare earth element such as Yb (ytterbium), a high-reflectivity fiber Bragg grating (FBG) 111 connected to the vicinity of a first end 112A of the amplifying optical fiber 112, a low-reflectivity FBG 113 connected to the vicinity of a second end 112B of the amplifying optical fiber 112, a plurality of pumping light sources 114A operable to introduce pump light into the amplifying optical fiber 112 from the first end 112A of the amplifying optical fiber 112, a combiner 116A operable to combine pumping light from the pumping light sources 114A, a plurality of pumping light sources 114B operable to introduce pump light into the amplifying optical fiber 112 from the second end 112B of the amplifying optical fiber 112, and a combiner 116B operable to combine pumping light from the pumping light source 114B.

For example, a high-power multimode semiconductor laser diode (LD) with a wavelength of 915 nm may be used for each of the pumping light sources 114A and 114B. The pumping light from the pumping light sources 114A is combined by the combiner 116A and introduced into the amplifying optical fiber 112 from the high-reflectivity FBG 111. Similarly, the pumping light from the pumping light sources 114B is combined by the combiner 116B and introduced into the amplifying optical fiber 112 from the low-reflectivity FBG 113. The amplifying optical fiber 112 preferably has a double-cladding structure including an inner cladding and an outer cladding having a refractive index lower than that of the inner cladding. The combiner 116B is connected to an optical fiber (delivery fiber) 118 having a single cladding, which extends to an outside of the fiber laser unit 110.

The high-reflectivity FBG 111 and the low-reflectivity FBG 113 are configured to reflect light having wavelengths corresponding to the wavelength of the laser beam and arranged so as to meet certain resonance conditions. The amplifying optical fiber 112, the high-reflectivity FBG 111, and the low-reflectivity FBG 113 form an optical cavity 119 for oscillating a laser beam generated in the amplifying optical fiber 112. The high-reflectivity FBG 111 preferably has a reflectance of 90% to 100%, and the low-reflectivity FBG 113 preferably has a reflectance of not more than 30%.

With this configuration, for example, when pumping light having a wavelength of 915 nm is introduced into the amplifying optical fiber 112 from the pumping light sources 114A and 114B, Yb of the amplifying optical fiber 112 is excited to cause stimulated emission with a 1000-nm wavelength range. This stimulated emission is laser-oscillated in the 1000-nm wavelength range by the high-reflectivity FBG 111 and the low-reflectivity FBG 113, which are arranged so as to meet certain resonance conditions. While part of the laser beam generated in the optical cavity 119 is reflected from the low-reflectivity FBG 113 and returned to the amplifying optical fiber 112, most of the laser beam is transmitted through the low-reflectivity FBG 113 and outputted as an output laser beam through the optical fiber 118 from the fiber laser unit 110. As shown in FIG. 1, output laser beams outputted from the respective fiber laser units 110 are combined into a high-power combined laser beam by the combiner 120. The high-power combined laser beam is emitted from the laser emission portion 130.

As shown in FIG. 2, each of the fiber laser units 110 is provided with an output laser beam power detection part 170 operable to detect the power of an output laser beam emitted from the optical cavity 119. The output laser beam power detection part 170 includes a photodetector 172 operable to detect leakage light from a fusion splicing portion 118A formed in the optical fiber 118 and an output laser beam power conversion part 174 operable to convert a detection signal of the photodetector 172 into a power of the output laser beam. A signal line from the output laser beam power conversion part 174 is connected to an adder part 162 of a failure detection part 160, which will be described later. The fusion splicing portion 118A is covered with a resin having a refractive index higher than the cladding of the optical fiber 118. The photodetector 172 is arranged near the fusion splicing portion 118A. In the present embodiment, the output laser beam power detection part 170 is provided within the fiber laser unit 110. Nevertheless, the output laser beam power detection part 170 may be provided outside of the fiber laser unit 110.

As shown in FIG. 1, the fiber laser apparatus 100 has a combined laser beam power detection part 140 operable to detect the power of the laser beam combined by the combiner 120. The combined laser beam power detection part 140 includes a photodetector 142 operable to detect leakage light from a fusion splicing portion 150A formed in the optical fiber 150, which connects the combiner 120 and the laser emission portion 130 to each other, and a combined laser beam power conversion part 144 operable to convert a detection signal of the photodetector 142 into a power of the combined laser beam (hereinafter referred to as a combined laser beam power). A signal line from the combined laser beam power conversion part 144 is connected to a comparator part 164 of the failure detection part 160, which will be described later. The fusion splicing portion 150A is covered with a resin having a refractive index higher than the cladding of the optical fiber 150. The photodetector 142 is arranged near the fusion splicing portion 150A.

As shown in FIG. 1, the fiber laser apparatus 100 includes the failure detection part 160 operable to detect occurrence of a failure in the fiber laser units 110. The failure detection part 160 includes an adder part 162 operable to sum up powers of the output laser beams inputted from the output laser beam power conversion parts 174 corresponding to the respective fiber laser units 110 to thereby calculate a total laser beam power, a comparator part 164 operable to compare the total laser beam power calculated by the adder part 162 with the combined laser beam power inputted from the combined laser beam power conversion part 144, a memory part 166 operable to store a threshold used to detect occurrence of a failure in the fiber laser units 110 and the like, and a determination part 168 operable to determine whether or not a failure occurs in the fiber laser units 110 based on the comparison results by the comparator part 164.

If no defect is found in the optical paths from the output laser beam power detection parts 170 of the respective fiber laser units 110 to the combined laser beam power detection part 140, then the combined laser beam power obtained at the combined laser beam power detection part 140 should be nearly equal to the total of the powers of the output laser beams that are obtained at the respective output laser beam power detection parts 170. However, if any defect is found in the optical fiber 118 between the output laser beam power detection part 170 of one of the fiber laser units 110 and the combiner 120, then no output laser beam is supplied to a downstream side of the defective portion. Therefore, the combined laser beam power obtained at the combined laser beam power detection part 140 becomes smaller than the total of the powers of the output laser beams that are obtained at the respective output laser beam power detection parts 170. In the present embodiment, the determination part 168 employs this phenomenon to determine whether or not any failure occurs in the fiber laser units 110.

Figure 3:
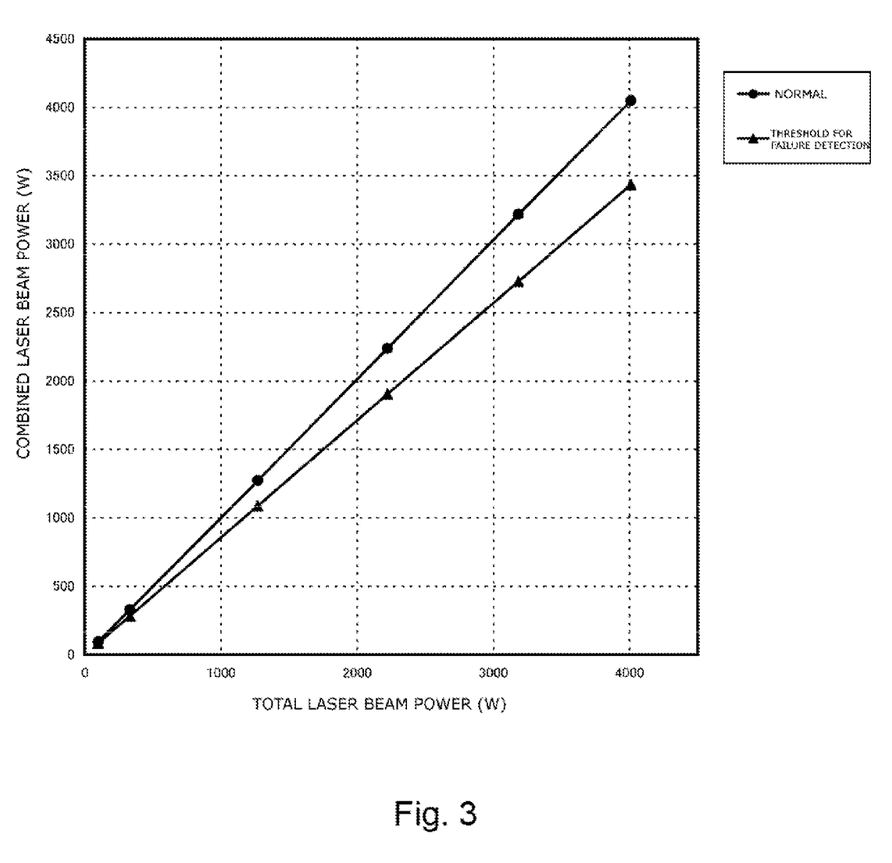
FIG. 3 is a graph explanatory of a threshold for determining that a failure has occurred in a fiber laser unit according to an embodiment of the present invention.

More specifically, if the optical fiber 118 extending from the output laser beam power detection part 170 of each of the fiber laser units 110 to the combiner 120 is under the normal conditions, then the combined laser beam power and the total laser beam power have substantially the same value as indicated by ● in FIG. 3. For example, if a failure (breakage) occurs in the optical fiber 118 extending between the output laser beam power detection part 170 of one of the fiber laser units 110 and the combiner 120, then the combined laser beam power becomes lowered by a power of an output laser beam of one fiber laser unit 110. In the present embodiment, there are seven fiber laser units 110. Therefore, when a ratio of the combined laser beam power to the total laser beam power is below 6/7, the determination part 168 determines that a failure has occurred in one of the fiber laser units 110. In other words, a threshold T for determining occurrence of a failure is set to be 6/7 in the example illustrated in FIG. 3. If a ratio of the combined laser beam power to the total laser beam power is below this threshold T (indicated by ▲ in FIG. 3), then the determination part 168 determines that a failure has occurred in one of the fiber laser units 110. If a failure is detected by the determination part 168, the operation of all of the fiber laser units 110 is interrupted.

Cases where the number of the fiber laser units 110 is other than seven are generalized as follows. A threshold $T=(U-1)/U$ is stored in the memory part 166 where U is the number of the fiber laser units 110. The determination part 168 determines that a failure has occurred in one of the fiber laser units 110 if a ratio of the combined laser beam power to the total laser beam power is below the threshold $T=(U-1)/U$, which is stored in the memory part 166.

As shown in FIG. 1, the failure detection part 160 has a drive control part 169 connected to power sources of the pumping light sources 114A and 114B of the respective fiber laser units 110. The drive control part 169 controls electric currents to be supplied to the pumping light sources 114A and 114B of the respective fiber laser units 110 so as to operate one fiber laser unit 110 to another in a sequential manner. When the determination part 168 determines that a failure has occurred in one of the fiber laser units 110 as described above, then the drive control part 169 operates one fiber laser unit 110 to another in a sequential manner. If no failure is found between the output laser beam power detection part 170 of the fiber laser unit 110 being currently operated and the combiner 120, then the combined laser beam power and the total laser beam power have substantially the same value. If a failure such as fiber breakage has occurred between the output laser beam power detection part 170 of the fiber laser unit 110 being operated and the combiner 120, the combined laser beam power is not maintained while the total laser beam power is maintained. Therefore, by sequentially operating one fiber laser unit 110 to another with the drive control part 169 and comparing the total laser beam power with the combined laser beam power, the determination part 168 can determine that a failure has occurred in the fiber laser unit 110 being currently operated. At that time, the drive control part 169 may operate each set of the fiber laser units 110 to specify a fiber laser unit 110 causing a failure based on the difference between the total laser beam power and the combined laser beam power. Furthermore, the respective fiber laser units 110 may have different output laser beam powers. In such a case, a fiber laser unit causing a failure may be determined by specifying a fiber laser unit 110 that corresponds to a lowered amount of the combined laser beam power.

Thus, according to the present embodiment, the total of the powers of the output laser beams (total laser beam power), which can be obtained at the output laser beam power detection parts 170 of the respective fiber laser units 110, is compared with the combined laser beam power, which can be obtained at the combined laser beam power detection part 140 disposed downstream of the combiner 120 that combines the output laser beams of the fiber laser units 110, to detect whether or not a failure such as fiber breakage has occurred between the output laser beam power detection parts 170 of the respective fiber laser units 110 and the combined laser beam power detection part 140 disposed downstream of the output laser beam power detection parts 170. In other words, any failure such as fiber breakage can be detected at any point between the output laser beam power detection parts 170 and the combined laser beam power detection part 140. Therefore, any failure of the optical fibers 118 and 150 can be detected within a wide range from the output laser beam power detection parts 170 to the combined laser beam power detection part 140 simply by providing two types of detection parts including the output laser beam power detection part 170 in each of the fiber laser units 110 and the combined laser beam power detection part 140. Thus, a large number of detection parts (photodetectors) are not required to be provided in each of the fiber laser units 110. Accordingly, the cost of the fiber laser apparatus 100 can be reduced.

Furthermore, since the total of the powers of the output laser beams (total laser beam power), which are obtained at the output laser beam power detection parts 170 of the respective fiber laser units 110, is compared with the combined laser beam power, which is obtained at the combined, laser beam power detection part 140, any failure that has occurred between the output laser beam power detection parts 170 and the combined laser beam power detection part 140 can be detected without any influence from any failure that has occurred on an upstream side of the output laser beam power detection parts 170. For example, if the pumping light source 114A or 114B located on an upstream side of the output laser beam power detection part 170 in one of the fiber laser units 110 is degraded such that the output of the pumping light sources 114A and 114B is lowered, the power of the output laser beam is lowered. Accordingly the power of the combined laser beam is lowered. However, the ratio of the combined laser beam power to the total laser beam power does not change. Therefore, any failure that has occurred between the output laser beam power detection parts 170 and the combined laser beam power detection part 140 can be detected without any influence of degradation of the pumping light sources 114A and 114B.

In the aforementioned embodiment, the determination part 168 determines whether a failure has occurred in one of the fiber laser units 110. The determination part 168 may determine whether a failure has occurred in a plurality of units of the fiber laser units 110. Specifically, if a failure occurs in a plurality of fiber laser units 110, the combined laser beam power is lowered in proportion to the number of the fiber laser units 110 suffering from the failure. Therefore, a plurality of thresholds T corresponding to the number of the fiber laser units 110 are stored in the memory part 166. The number of the fiber laser units 110 suffering from the failure can be determined by comparing a ratio of the combined laser beam power to the total laser beam power with those thresholds T.

Figure 4:
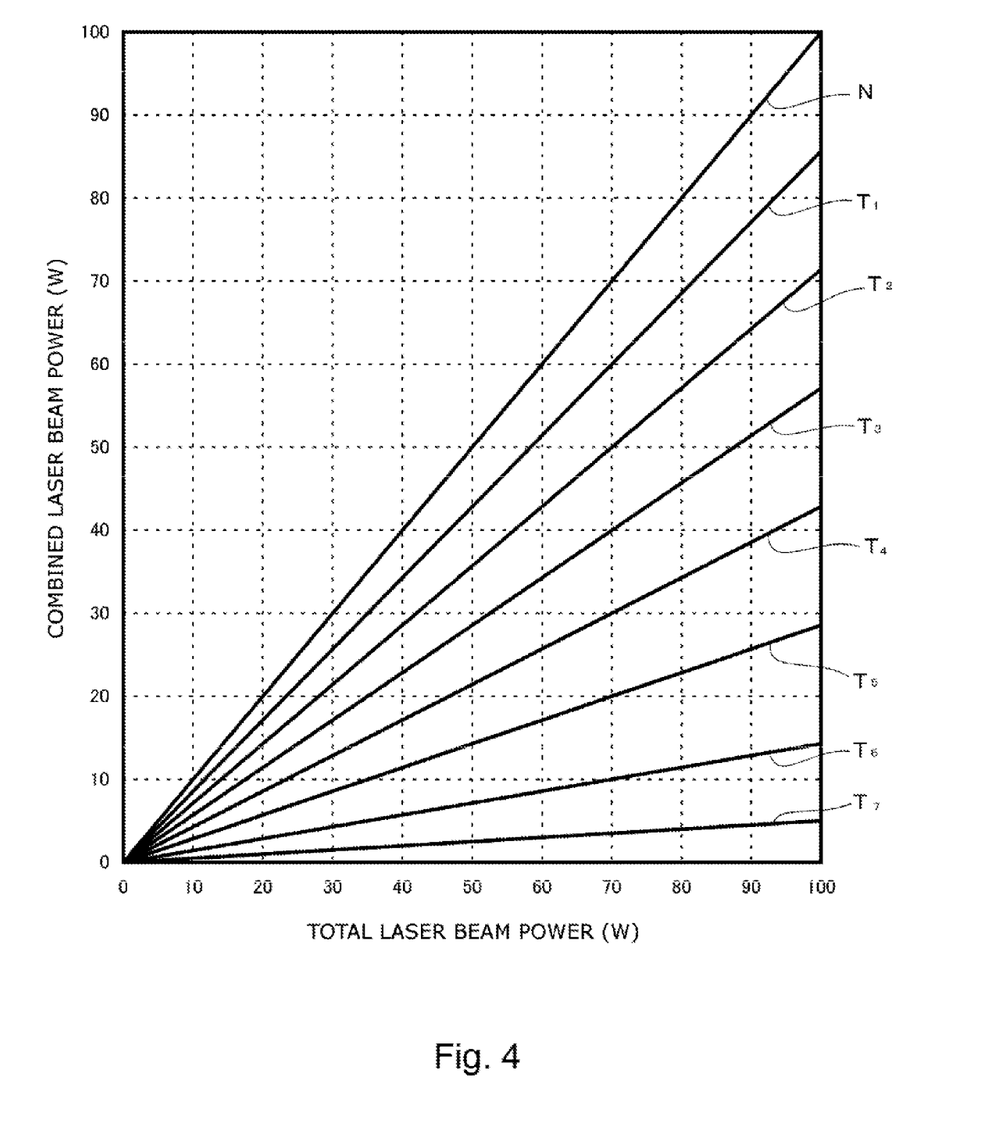
FIG. 4 is a graph explanatory of thresholds for determining that a failure has occurred in one or more fiber laser units according to an embodiment of the present invention.

FIG. 4 shows a plurality of thresholds being set depending upon the number of fiber laser units 110. In FIG. 4, N represents the relationship between the combined laser beam power and the total laser beam power under the normal conditions. $T_1$ to $F_6$ represent thresholds used to determine whether or not a failure has occurred in one to six fiber laser units 110, respectively. $T_7$ represents a threshold used to determine whether or not a failure has occurred in all of the fiber laser units 110 or whether or not a failure has occurred between the combiner 120 and the combined laser beam power detection part 140. Specifically, $T_1=6/7$, $T_2=5/7$, $T_3=4/7$. $T_4=3/7$, $T_5=2/7$, and $T_6=1/7$. In other words, the threshold $T_n$ for determining whether or not a failure has occurred in n fiber laser units 110 is $T_n=(U-n)/U$ where U is the number of the fiber laser units 110. Although $T_7=0$ according to this formula, $T_7$ may be set to be greater than 0 and smaller than $T_6$ in order to detect that a failure has occurred on a downstream side of the combiner 120.

The detection accuracy of the power at the output laser beam power detection parts 170 and the detection accuracy of the power at the combined laser beam power detection part 140 are not taken into account in the aforementioned embodiment. However, those detection accuracies may be taken into account to set the threshold T. Specifically, the threshold T may be set to meet the following inequality:

$$(1+\alpha)\cdot T < 1-\beta$$
$$(1-\alpha)\cdot T \geq (1+\beta)\frac{U-1}{U}$$

where U is the number of the fiber laser units 110, $\pm\alpha$ is the detection accuracy of the power at the output laser beam power detection parts 170, and $\pm\beta$ is the detection accuracy of the power at the combined laser beam power detection part 140.

For example, when the number of the fiber laser units 110 is seven and $\alpha=\beta$ then the threshold F that meets the above inequality is T=0.926. The detection accuracies are such that $\alpha=\beta=3.85\%$. In this manner, when the detection accuracies at the output laser beam power detection parts 170 and the combined laser beam power detection part 140 are taken into account, misjudgment can be avoided at the failure detection part 160.

The above inequality is used to determine whether or not a failure has occurred in one of U fiber laser units 110. In order to detect that a failure has occurred in n of U fiber laser units 110, the threshold T may be set to meet the following inequality.

$$(1+\alpha)\cdot T < 1-\beta$$
$$(1-\alpha)\cdot T \geq (1+\beta)\frac{U-n}{U}$$

In the aforementioned embodiment, each of the output laser beam power detection parts 170 receives and detects leakage light from the fusion splicing portion 118A with the photodetector 172, and the combined laser beam power detection part 140 receives and detects leakage light from the fusion splicing portion 150A with the photodetector 142. However, the present invention is not limited to this configuration. For example, part of the laser beam propagating through the optical fiber 118 or 150 may be extracted by an optical coupler and detected by the photodetector 172 or 142. The optical fiber 118 or 150 may be bent, and part of the laser beam propagating through the optical fiber 118 or 150 may be emitted from the bent portion and detected by the photodetector 172 or 142.

Figure 5:
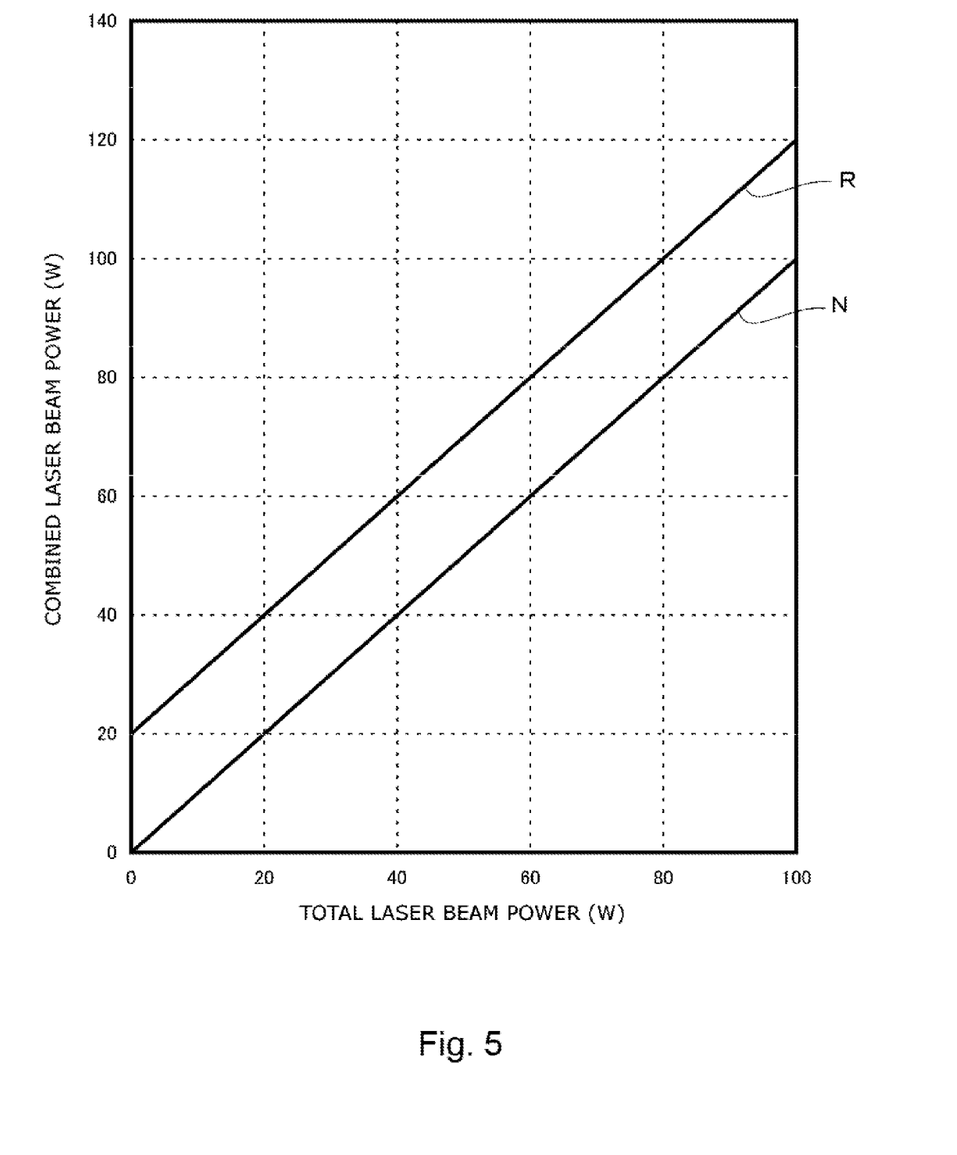
FIG. 5 is a graph explanatory of a threshold for determining a failure caused by feedback light reflected back from a workpiece according to an embodiment of the present invention.

Furthermore, in order to reduce influence from feedback light generated when the combined laser beam emitted from the fiber laser apparatus 100 is reflected back from a workpiece, it is preferable to dispose the photodetector 142 of the combined laser beam power detection part 140 on a downstream side of the fusion splicing portion 150A. Alternatively, the combined laser beam power detection part 140 may be disposed at a location where it can receive feedback light, such as at an upstream side of the fusion splicing portion 150A. In such a case, the fiber laser apparatus 100 can be interrupted when the amount of feedback light becomes equal to or greater than a certain tolerance. Specifically, feedback light increases the combined laser beam power obtained at the combined laser beam power detection part 140 by the power of the feedback light as compared to the combined laser beam power under the normal conditions. Therefore, as shown in FIG. 5, the threshold R for determining whether or not the amount of the feedback light becomes equal to or greater than the tolerance is set to be greater than 1. When a ratio of the combined laser beam power to the total laser beam power becomes equal to or higher than the threshold R, it is determined that the amount of the feedback light has become equal to or greater than the tolerance. In such a case, the fiber laser apparatus 100 is interrupted.

In the above embodiment, the pumping light sources 114A and 114B and the combiners 116A and 116B are provided near each of the high-reflectivity FBG 111 and the low-reflectivity FBG 113 so as to form a bidirectional pumping type fiber laser apparatus. Nevertheless, one or more pumping light sources and a combiner may be provided near only either one of the high-reflectivity FBG 111 and the low-reflectivity FBG 113.

Although some preferred embodiments of the present invention have been described, the present invention is not limited to the aforementioned embodiments. It should be understood that various different forms may be applied to the present invention within the technical idea thereof.

INDUSTRIAL APPLICABILITY

The present invention is suitable fix use in a fiber laser apparatus operable to optically combine laser beams from a plurality of fiber laser units and output the combined beam.

DESCRIPTION OF REFERENCE NUMERALS AND SIGNS 100 fiber laser apparatus
110 fiber laser unit
111 high-reflectivity FBG
112 amplifying optical fiber
112A first end
112B second end
113 low-reflectivity FBG
114A, 114B pumping light source
116A, 116B combiner
118 optical fiber
118A fusion splicing portion
119 optical cavity
120 combiner
130 laser emission portion
140 combined laser beam power detection part
142 photodetector
144 combined laser beam power conversion part
150 optical fiber
150A fusion splicing portion
160 failure detection part
162 adder part
164 comparator part
166 memory part
168 determination part
169 drive control part
170 output laser beam power detection part
172 photodetector
174 output laser beam power conversion part

The invention claimed is:

1. A fiber laser apparatus comprising:
   a plurality of fiber laser units each having an amplifying optical fiber operable to amplify a laser beam, a pumping light source operable to supply pumping light to the amplifying optical fiber, and an optical cavity operable to oscillate the laser beam;
   a combiner operable to optically combine output laser beams outputted from the plurality of fiber laser units to generate a combined laser beam;
   a laser emission portion operable to emit the combined laser beam generated by the combiner;
   a plurality of output laser beam power detection parts operable to detect a power of an output laser beam outputted from the optical cavity of each of the plurality of fiber laser units;
   a combined laser beam power detection part operable to detect a power of the combined laser beam generated by the combiner; and
   a failure detection part including an adder part operable to sum up the powers of the output laser beams detected by the output laser beam power detection parts of the plurality of fiber laser units to calculate a total laser beam power, a comparator part operable to compare the total laser beam power calculated by the adder part with a power of the combined laser beam detected by the combined laser beam power detection part, and a determination part operable to determine that a failure has occurred in at least one of the plurality of fiber laser units when a ratio of the power of the combined laser beam to the total laser beam power becomes lower than a predetermined threshold T.

2. The fiber laser apparatus as recited in claim 1, wherein the predetermined threshold T is set to be (U−1)/U where U is the number of the plurality of fiber laser units, and
   the determination part of the failure detection part determines that a failure has occurred in one of the plurality of fiber laser units when a ratio of the power of the combined laser beam to the total laser beam power becomes lower than the predetermined threshold T.

3. The fiber laser apparatus as recited in claim 1, wherein the predetermined threshold T is set to be (U−n)/U where U is the number of the plurality of fiber laser units, and n is an integer that is equal to or greater than 1 but equal to or smaller than U, and
   the determination part of the failure detection part determines that a failure has occurred in n of the plurality of fiber laser units when a ratio of the power of the combined laser beam to the total laser beam power becomes lower than the predetermined threshold T.

4. The fiber laser apparatus as recited in claim 1, wherein the predetermined threshold T is set so as to meet the following inequality:

$$(1+\alpha) \cdot T < 1-\beta$$
$$(1-\alpha) \cdot T \geq (1+\beta)\frac{U-1}{U}$$

where U is the number of the plurality of fiber laser units, ±α is a detection accuracy of the power at the output laser beam power detection part, and ±β is a detection accuracy of the power at the combined laser beam power detection part, and
   the determination part of the failure detection part determines that a failure has occurred in one of the plurality of fiber laser units when a ratio of the power of the combined laser beam to the total laser beam power becomes lower than the predetermined threshold T.

5. The fiber laser apparatus as recited in claim 1, wherein the predetermined threshold T is set so as to meet the following inequality:

$$(1+\alpha) \cdot T < 1-\beta$$
$$(1-\alpha) \cdot T \geq (1+\beta)\frac{U-n}{U}$$

where U is the number of the plurality of fiber laser units, n is an integer that is equal to or greater than 1 but equal to or smaller than U, ±α is a detection accuracy of the power at the output laser beam power detection part, and ±β is a detection accuracy of the power at the combined laser beam power detection part, and
   the determination part of the failure detection part determines that a failure has occurred in n of the plurality of fiber laser units when a ratio of the power of the combined laser beam to the total laser beam power becomes lower than the predetermined threshold T.

6. The fiber laser apparatus as recited in claim 1, wherein the failure detection part includes a drive control part operable to control a current to be supplied to pumping light sources of the plurality of fiber laser units so as to operate at least one of the plurality of fiber laser units in sequence, and
   the determination part of the failure detection part specifies a fiber laser unit in which the failure has occurred from the at least one of the plurality of fiber laser units that is being driven by the drive control part, based on a difference between the total laser beam power calculated by the adder part and the power of the combined laser beam that is detected by the combined laser beam power detection part.

7. The fiber laser apparatus as recited in claim 1, wherein the combined laser beam power detection part includes a photodetector operable to receive leakage light from a fusion splicing portion provided on an optical fiber connecting between the combiner and the laser emission portion, the photodetector being disposed on a downstream side of the fusion splicing portion.

8. A method of detecting a failure in a fiber laser apparatus operable to emit a combined laser beam into which output laser beams outputted from a plurality of fiber laser units are combined by a combiner, the plurality of fiber laser units each having an amplifying optical fiber operable to amplify a laser beam, a pumping light source operable to supply pumping light to the amplifying optical fiber, and an optical cavity operable to oscillate the laser beam, the method comprising:
   detecting a power of the output laser beam outputted from the optical cavity of each of the plurality of fiber laser units;
   detecting a power of the combined laser beam on a downstream side of the combiner;
   summing up the detected powers of the output laser beams from the plurality of fiber laser units to calculate a total laser beam power;
   comparing the total laser beam power with the detected power of the combined laser beam; and
   determining that a failure has occurred in at least one of the plurality of fiber laser units when a ratio of the power of the combined laser beam to the total laser beam power becomes lower than a predetermined threshold T.

9. The method of detecting a failure in a fiber laser apparatus as recited in claim 8, further comprising setting the predetermined threshold T to be (U−1)/U where U is the number of the plurality of fiber laser units,
wherein the determining comprises determining that a failure has occurred in one of the plurality of fiber laser units when a ratio of the power of the combined laser beam to the total laser beam power becomes lower than the predetermined threshold T.

10. The method of detecting a failure in a fiber laser apparatus as recited in claim 8, further comprising setting the predetermined threshold T to be (U−n)/U where U is the number of the plurality of fiber laser units, and n is an integer that is equal to or greater than 1 but equal to or smaller than U,
wherein the determining comprises determining that a failure has occurred in n of the plurality of fiber laser units when a ratio of the power of the combined laser beam to the total laser beam power becomes lower than the predetermined threshold T.

11. The method of detecting a failure in a fiber laser apparatus as recited in claim 8, further comprising setting the predetermined threshold T so as to meet the following inequality:

$$(1+\alpha) \cdot T < 1 - \beta$$
$$(1-\alpha) \cdot T \geq (1+\beta)\frac{U-1}{U}$$

where U is the number of the plurality of fiber laser units, $\pm\alpha$ is a detection accuracy of the power at the output laser beam power detection part, and $\pm\beta$ is a detection accuracy of the power at the combined laser beam power detection part,
wherein the determining comprises determining that a failure has occurred in one of the plurality of fiber laser units when a ratio of the power of the combined laser beam to the total laser beam power becomes lower than the predetermined threshold T.

12. The method of detecting a failure in a fiber laser apparatus as recited in claim 8, further comprising setting the predetermined threshold T so as to meet the following inequality:

$$(1+\alpha) \cdot T < 1 - \beta$$
$$(1-\alpha) \cdot T \geq (1+\beta)\frac{U-n}{U}$$

where U is the number of the plurality of fiber laser units, n is an integer that is equal to or greater than 1 but equal to or smaller than U, $\pm\alpha$ is a detection accuracy of the power at the output laser beam power detection part, and $\pm\beta$ is a detection accuracy of the power at the combined laser beam power detection part,
wherein the determining comprises determining that a failure has occurred in n of the plurality of fiber laser units when a ratio of the power of the combined laser beam to the total laser beam power becomes lower than the predetermined threshold T.

13. The method of detecting a failure in a fiber laser apparatus as recited in claim 8, further comprising:
controlling a current to be supplied to pumping light sources of the plurality of fiber laser units so as to operate at least one of the plurality of fiber laser units in sequence when it is determined that a failure has occurred in at least one of the plurality of fiber laser units; and
specifying a fiber laser unit in which the failure has occurred from the at least one of the plurality of fiber laser units that is being driven, based on a difference between the total laser beam power and the power of the combined laser beam.

14. The method of detecting a failure in a fiber laser apparatus as recited in claim 8, wherein the detecting the power of the combined laser beam comprises receiving leakage light from a fusion splicing portion on a downstream side of the fusion splicing portion, the fusion splicing portion being provided on a downstream side of the combiner.

* * * * *